(12) United States Patent
Kain

(10) Patent No.: US 12,244,448 B2
(45) Date of Patent: Mar. 4, 2025

(54) ENHANCED COMMUNICATION SYSTEM

(71) Applicant: James Kain, Santa Rosa, FL (US)

(72) Inventor: James Kain, Santa Rosa, FL (US)

( * ) Notice: Subject to any disclaimer, the term of this patent is extended or adjusted under 35 U.S.C. 154(b) by 0 days.

(21) Appl. No.: 18/786,350

(22) Filed: Jul. 26, 2024

(65) Prior Publication Data
US 2025/0047546 A1 Feb. 6, 2025

Related U.S. Application Data

(60) Provisional application No. 63/529,843, filed on Jul. 31, 2023.

(51) Int. Cl.
*H04L 27/34* (2006.01)
*H04L 25/03* (2006.01)

(52) U.S. Cl.
CPC ........ *H04L 27/34* (2013.01); *H04L 25/03006* (2013.01); *H04L 2025/0342* (2013.01)

(58) Field of Classification Search
CPC ............... H04L 25/03; H04L 25/03006; H04L 25/03012; H04L 25/03019; H04L 25/03057; H04L 25/03031; H04L 25/0307; H04L 25/03082; H04L 25/03101; H04L 27/34; H04L 27/38; H04L 27/389; H04L 2025/0342; H04L 2025/03433; H04L 2025/03439; H04L 2025/03445; H04L 2025/03471; H04L 2025/03484
See application file for complete search history.

(56) References Cited

U.S. PATENT DOCUMENTS

| | | | | |
|---|---|---|---|---|
| 4,833,711 A | * | 5/1989 | Ueda | G10L 15/00 327/350 |
| 5,283,811 A | * | 2/1994 | Chennakeshu | H04L 7/0062 375/233 |
| 5,353,307 A | * | 10/1994 | Lester | H04L 25/03057 375/348 |
| 5,894,323 A | * | 4/1999 | Kain | G01C 11/02 348/116 |
| 6,477,465 B1 | * | 11/2002 | McCall | G01C 21/188 73/178 R |
| 6,529,559 B2 | * | 3/2003 | Reshef | H04L 25/067 375/262 |
| 6,658,354 B2 | * | 12/2003 | Lin | G01C 21/1654 701/472 |

(Continued)

*Primary Examiner* — James M Perez
(74) *Attorney, Agent, or Firm* — Chris Tanner; BlueCollarIP.com

(57) ABSTRACT

An improved non-OFDM communication system and method replaces an FFT at the receiver with an alternative processing configuration. The use of dense subcarriers and assigning A, B pairs based upon a pre-assigned QAM bit-mapped constellation will be maintained as with traditional OFDM. However, the receiver sample-rate is independent of subcarrier frequency-separation, and the system does not maintain separate real and imaginary signals at the transmitter and receiver. The system also processes receiver samples incrementally without awaiting the end of the modulation cycle, and uses incrementally-processed data to characterize disruptions introduced by the channel so as to better adapt to these disruptions. The system has the potential to increase signal throughput by a factor of two by re-using one of the freed-up information paths previously used by the real and imaginary signals.

20 Claims, 14 Drawing Sheets

(56) References Cited

U.S. PATENT DOCUMENTS

| | | | | |
|---|---|---|---|---|
| 6,754,584 | B2* | 6/2004 | Pinto | G01S 19/36 |
| | | | | 701/470 |
| 7,136,751 | B2* | 11/2006 | Pinto | G01S 19/26 |
| | | | | 701/472 |
| 7,239,682 | B2* | 7/2007 | Liu | H04L 7/0054 |
| 7,671,794 | B2* | 3/2010 | Pinto | G01S 19/47 |
| | | | | 342/357.29 |
| 8,116,710 | B2* | 2/2012 | Dent | H04L 25/03101 |
| | | | | 455/67.11 |
| 9,590,803 | B2* | 3/2017 | Derras | H04L 7/027 |
| 10,107,919 | B1* | 10/2018 | Chapman | G01S 19/35 |
| 10,424,105 | B2* | 9/2019 | Summerville | G01C 11/02 |
| 11,283,476 | B2* | 3/2022 | Judell | H03D 3/007 |
| 11,552,662 | B1* | 1/2023 | Jorgenson | H04L 25/03159 |
| 11,616,666 | B2* | 3/2023 | Amjad | H04L 25/021 |
| | | | | 375/262 |
| 11,711,103 | B2* | 7/2023 | Judell | H03D 1/00 |
| | | | | 375/219 |
| 11,770,197 | B2* | 9/2023 | Zhang | H04B 17/309 |
| | | | | 382/103 |
| 2002/0008661 | A1* | 1/2002 | McCall | G01S 19/47 |
| | | | | 701/472 |
| 2002/0154704 | A1* | 10/2002 | Reshef | H04L 1/0071 |
| | | | | 375/262 |
| 2002/0165669 | A1* | 11/2002 | Pinto | G01S 19/26 |
| | | | | 701/408 |
| 2003/0048357 | A1* | 3/2003 | Kain | G01C 11/02 |
| | | | | 348/117 |
| 2003/0112370 | A1* | 6/2003 | Long | H04N 7/08 |
| | | | | 348/E7.024 |
| 2004/0091069 | A1* | 5/2004 | Liu | G11B 20/1403 |
| 2004/0257441 | A1* | 12/2004 | Pevear | B64D 47/08 |
| | | | | 348/144 |
| 2005/0004748 | A1* | 1/2005 | Pinto | G01S 19/54 |
| | | | | 701/470 |
| 2006/0100781 | A1* | 5/2006 | Lin | G01C 21/28 |
| | | | | 701/472 |
| 2008/0154495 | A1* | 6/2008 | Breed | G01C 21/20 |
| | | | | 701/472 |
| 2009/0149202 | A1* | 6/2009 | Hill | G01S 5/0289 |
| | | | | 342/357.22 |
| 2009/0295633 | A1* | 12/2009 | Pinto | G01S 19/47 |
| | | | | 342/357.29 |
| 2010/0311350 | A1* | 12/2010 | Dent | H04L 25/03101 |
| | | | | 455/67.11 |
| 2016/0204914 | A1* | 7/2016 | Agee | H04W 72/23 |
| | | | | 370/329 |
| 2016/0323091 | A1* | 11/2016 | Inoue | H04B 10/6164 |
| 2017/0102465 | A1* | 4/2017 | Yu | G01S 19/29 |
| 2018/0053336 | A1* | 2/2018 | Summerville | G01C 21/3852 |
| 2018/0156920 | A1* | 6/2018 | Diggelen | H04L 25/03101 |
| 2018/0262369 | A1* | 9/2018 | Ruebsamen | H04L 25/0214 |
| 2018/0317800 | A1* | 11/2018 | Coleman | A61B 5/296 |
| 2018/0351590 | A1* | 12/2018 | Arditti Ilitzky | H04B 1/10 |
| 2019/0097865 | A1* | 3/2019 | Xu | A61B 5/113 |
| 2019/0158340 | A1* | 5/2019 | Zhang | H04B 17/318 |
| 2019/0166030 | A1* | 5/2019 | Chen | H04L 7/042 |
| 2019/0178980 | A1* | 6/2019 | Zhang | A61B 5/7267 |
| 2019/0327124 | A1* | 10/2019 | Lai | G01S 5/017 |
| 2020/0064444 | A1* | 2/2020 | Regani | G01S 7/006 |
| 2020/0064456 | A1* | 2/2020 | Xu | G01S 13/456 |
| 2020/0109988 | A1* | 4/2020 | Sterczewski | G01N 21/45 |
| 2020/0116817 | A1* | 4/2020 | Chuo | H04L 27/2627 |
| 2020/0182995 | A1* | 6/2020 | Zeng | G01S 13/003 |
| 2020/0191913 | A1* | 6/2020 | Zhang | G01S 7/412 |
| 2020/0191943 | A1* | 6/2020 | Wu | G01S 13/726 |
| 2020/0204281 | A1* | 6/2020 | King | H04L 7/0335 |
| 2020/0271747 | A1* | 8/2020 | Wu | G01P 15/18 |
| 2020/0271749 | A1* | 8/2020 | Wu | G01S 5/0278 |
| 2020/0300972 | A1* | 9/2020 | Wang | A61B 5/0002 |
| 2020/0302187 | A1* | 9/2020 | Wang | G06V 20/52 |
| 2020/0319324 | A1* | 10/2020 | Au | H04W 48/16 |
| 2020/0322868 | A1* | 10/2020 | Claffey | H04W 40/02 |
| 2020/0366386 | A1* | 11/2020 | Bugos | A61B 5/0022 |
| 2020/0397365 | A1* | 12/2020 | Zhang | G16H 50/20 |
| 2020/0405223 | A1* | 12/2020 | Mai | H04B 1/713 |
| 2020/0406860 | A1* | 12/2020 | Mai | B60R 25/31 |
| 2020/0408875 | A1* | 12/2020 | Mai | G01S 7/006 |
| 2021/0013914 | A1* | 1/2021 | Judell | H03D 3/007 |
| 2021/0091866 | A1* | 3/2021 | Zhang | H04B 17/309 |
| 2021/0135733 | A1* | 5/2021 | Huang | G06N 3/084 |
| 2021/0136515 | A1* | 5/2021 | Zhang | H04W 4/023 |
| 2021/0136681 | A1* | 5/2021 | Mai | G08B 29/188 |
| 2021/0160709 | A1* | 5/2021 | Marumo | H04W 24/02 |
| 2021/0173045 | A1* | 6/2021 | Hu | G01S 7/415 |
| 2021/0173046 | A1* | 6/2021 | Regani | G01S 13/44 |
| 2021/0184795 | A1* | 6/2021 | Ibars Casas | H03M 13/6561 |
| 2021/0190702 | A1* | 6/2021 | Wu | G01S 7/411 |
| 2021/0215788 | A1* | 7/2021 | Hu | G01S 13/56 |
| 2021/0215789 | A1* | 7/2021 | Hu | G01S 7/415 |
| 2021/0232235 | A1* | 7/2021 | Regani | G06F 3/0346 |
| 2021/0247483 | A1* | 8/2021 | Wang | G01S 13/003 |
| 2021/0266022 | A1* | 8/2021 | Li | H04L 25/024 |
| 2021/0311162 | A1* | 10/2021 | Mai | G01S 7/415 |
| 2021/0311166 | A1* | 10/2021 | Wu | G01S 13/003 |
| 2021/0320825 | A1* | 10/2021 | Banuli Nanje Gowda | H04L 25/03968 |
| 2021/0379370 | A1* | 12/2021 | Windmiller | A61B 5/145 |
| 2021/0396843 | A1* | 12/2021 | Santra | G01S 7/415 |
| 2021/0399924 | A1* | 12/2021 | Amjad | H04L 25/0222 |
| 2022/0026519 | A1* | 1/2022 | Wu | G01S 7/006 |
| 2022/0026530 | A1* | 1/2022 | Wu | G01S 7/006 |
| 2022/0026531 | A1* | 1/2022 | Wu | G01S 13/88 |
| 2022/0096003 | A1* | 3/2022 | Mai | H04L 25/0226 |
| 2022/0107303 | A1* | 4/2022 | Goltzman | G01N 33/2847 |
| 2022/0209801 | A1* | 6/2022 | Judell | H04B 1/123 |
| 2022/0227503 | A1* | 7/2022 | Barnhart | B64G 1/242 |
| 2022/0263691 | A1* | 8/2022 | Furtek | H04L 25/067 |
| 2022/0291328 | A1* | 9/2022 | Ozturk | G01S 5/06 |
| 2022/0299619 | A1* | 9/2022 | Hu | G01S 13/878 |
| 2022/0303167 | A1* | 9/2022 | Wang | H04W 72/21 |
| 2022/0308195 | A1* | 9/2022 | Zeng | G01S 13/003 |
| 2022/0357302 | A1* | 11/2022 | Cronin | G01N 29/4427 |
| 2022/0386945 | A1* | 12/2022 | Wu | A61B 5/1123 |
| 2023/0014580 | A1* | 1/2023 | Zhu | G01C 21/3867 |
| 2023/0021342 | A1* | 1/2023 | Wang | A61B 5/0507 |
| 2023/0044784 | A1* | 2/2023 | Hauser | G06Q 50/06 |
| 2023/0068962 | A1* | 3/2023 | Zambon | B01D 46/0086 |
| 2023/0081472 | A1* | 3/2023 | Wang | H04W 4/029 |
| | | | | 340/539.12 |
| 2023/0090763 | A1* | 3/2023 | Ozturk | H04W 4/027 |
| | | | | 455/456.1 |
| 2023/0188384 | A1* | 6/2023 | Claffey | H04L 25/022 |
| | | | | 375/262 |
| 2023/0273291 | A1* | 8/2023 | Ozturk | G01S 13/003 |
| | | | | 342/52 |
| 2023/0296529 | A1* | 9/2023 | Moravec | G07C 5/0808 |
| | | | | 356/70 |
| 2023/0333201 | A1* | 10/2023 | Regani | G01S 13/86 |
| 2023/0388840 | A1* | 11/2023 | Au | G01S 13/56 |
| 2024/0064691 | A1* | 2/2024 | Hu | G01S 13/003 |
| 2024/0125888 | A1* | 4/2024 | Zhu | G01S 7/415 |
| 2024/0125915 | A1* | 4/2024 | Au | G01S 13/765 |
| 2024/0129166 | A1* | 4/2024 | Au | H04L 27/2647 |
| 2024/0129778 | A1* | 4/2024 | Au | H04W 24/10 |
| 2024/0129779 | A1* | 4/2024 | Au | H04L 5/0051 |
| 2024/0175983 | A1* | 5/2024 | Zhu | G01S 13/86 |
| 2024/0179550 | A1* | 5/2024 | Au | G01S 13/88 |
| 2024/0183936 | A1* | 6/2024 | Au | H04L 67/12 |
| 2024/0297809 | A1* | 9/2024 | Furtek | H04L 25/067 |
| 2024/0297810 | A1* | 9/2024 | Furtek | H04L 25/03171 |

* cited by examiner

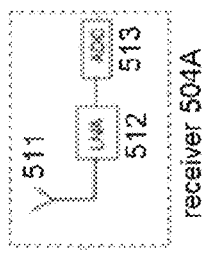
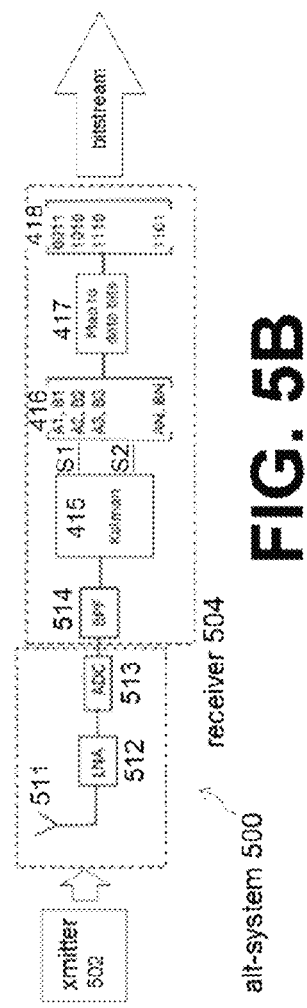

EXAMPLE 2: a conventional home-router using the system 400

EXAMPLE 1: Musk's Starlink using the system 400

ENHANCED COMMUNICATION SYSTEM

BACKGROUND OF THE INVENTION

Conventional digital communication is over-committed to FFT. Consequently, an improved communication is desired, in which FFT is supplanted by methods that take advantage of fast digital sampling and better identification of channel characteristics.

FIG. 1 shows a conventional multicarrier waveform. As shown in FIG. 1 (Prior Art), the transmission of high-speed digital data typically uses a multicarrier waveform with multiple individually-modulated subcarriers. Such transmission is conventional and well-known.

FIG. 2 (Prior Art) shows a conventional use of both real & imaginary time-histories transmitted via a conventional multi-carrier communication system 100 having a Tx unit 104, an Rx unit 108, working together using multiple communication channel 124. The conventional system 100 uses Orthogonal Frequency Division Multiplexing (OFDM), where N (2 or more) subcarriers 130 are generated by an Inverse Fast Fourier Transform (IFFT) unit 112 located within the TX unit 104.

The IFFT module 112 within the Tx unit 104 operates expecting that each subcarrier 130 is represented by two coefficients (A and B) that define the phase and amplitude of each subcarrier. Each A, B pair are mapped to a bit-sequence of length m so that m data bits can be transferred for each modulation cycle. For each modulation cycle, N subcarriers modulated with unique A, B values are transmitted. The A,B values are held constant over each modulation cycle and the signal at the receiver is sampled in a manner so as to recover the A,B values. With OFDM, both the real and imaginary independent data streams must be transmitted and received using the same frequency spectrum in order to recover the A, B values.

The various subcarrier waveforms are summed by the IFFT module 112, which results in real and imaginary time-history terms that are sent across the communication channel 120 to the receiver unit Rx 116. At the receiver unit 116, the Fast Fourier Transform (FFT) module 108 recovers the A, B coefficients that describe each subcarrier and (after some processing) eventually recovers the original input bitstream.

FIG. 3 (Prior Art) shows repeating modulation events where subcarrier phases & amplitudes are changed to represent a new bit grouping. FIG. 3 also shows how the subcarrier waveforms are updated to represent a new bit group at each modulation event that occurs at a regular time interval. The receiver unit 108 samples the real and imaginary transmitted signals and stores these samples during the modulation cycle. After the receiver captures the data from a complete cycle, the captured data is processed by the FFT to re-generate the A, B pairs and their bit groups. Because the FFT requires all the data to be available from a modulation cycle, the FFT processing must and will overlap the capture of data from the next modulation cycle.

Although the Prior Art system 100 of FIGS. 1-3 represents a time-honored communication platform, the system 100 still suffers from some flaws. First, maintaining two independent time-histories (real and imagery) requires multiple components and consumes processing time and power. Second, all data processed in the FFT module 112 is always processed the exact same way, regardless of load or content and only after all the data has been collected and stored. Furthermore, the use of the FFT constrains the receiver to sample at exactly the inverse of the sub-carrier frequency spacing so that no benefit can be gained through sampling at a higher rate. This is like having a powerful Ferrari engine that spends most of its time only backing in and out of the driveway, at 5 miles per hour. Modern digital sampling capabilities far exceed what is used by current OFDM systems, but this capability cannot be used because of the FFT's constraint on the digital sampling rate. A lot of resources in the system 100 are idle, wasted, not properly used to their full capacity.

SUMMARY OF THE INVENTION

The embodiments herein re-assess OFDM based upon replacing the FFT at the receiver with an alternative processing configuration. The use of dense subcarriers and assigning A, B pairs based upon a pre-assigned QAM bit-mapped constellation will be maintained as with traditional OFDM. However, the embodiments herein achieve the following.

Make the receiver sample-rate "independent of subcarrier frequency-separation";

Remove the requirement to maintain separate real and imaginary signals at the transmitter and receiver. Remove the "subcarrier orthogonality constraint" so that subcarrier frequencies can be placed in an arbitrary manner;

Allow a multipath guard interval, where the modulation period is extended, to be adaptively determined;

Moreover, the new receivers 404, 1104, others . . .

Can be widely used in fields other than communications;
Process samples incrementally without awaiting the end of the modulation cycle;
Uses the incrementally-processed data to characterize disruptions introduced by the channel so as to better adapt to these disruptions;
Is optimal: There is no better processing configuration if the models are correct; and
Has the potential to increase throughput by a factor of two by re-using one of the freed-up information paths previously used by the real and imaginary signals.

BRIEF DESCRIPTION OF THE DRAWINGS

FIG. 5A shows a minimal cost radio-frequency receiver;

FIG. 5B shows an alternative receiver system;

DETAILED DESCRIPTION OF THE PREFERRED EMBODIMENTS

Notes on Semantics and Architecture

Figure 1:
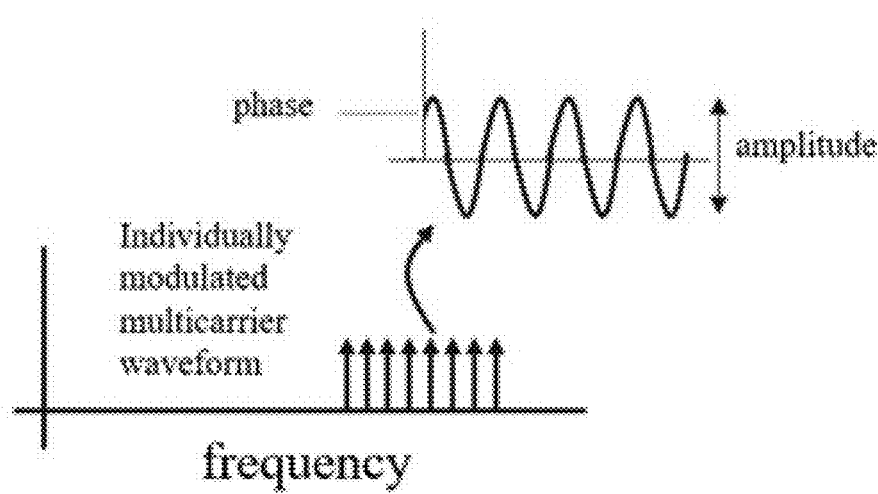
FIG. 1 (Prior Art) shows an example transmission of high-speed digital data using a multicarrier waveform.
Figure 2:
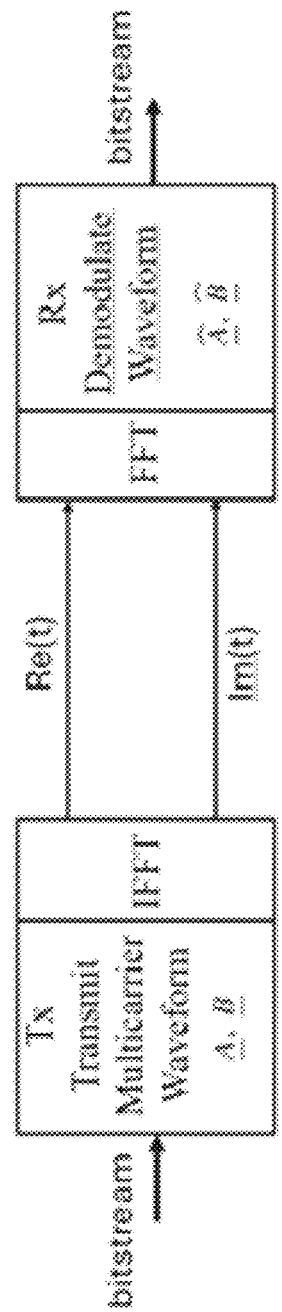
FIG. 2 (Prior Art) shows a conventional use of both real & imaginary time-histories transmitted via a conventional multi-carrier communication system.
Figure 3:
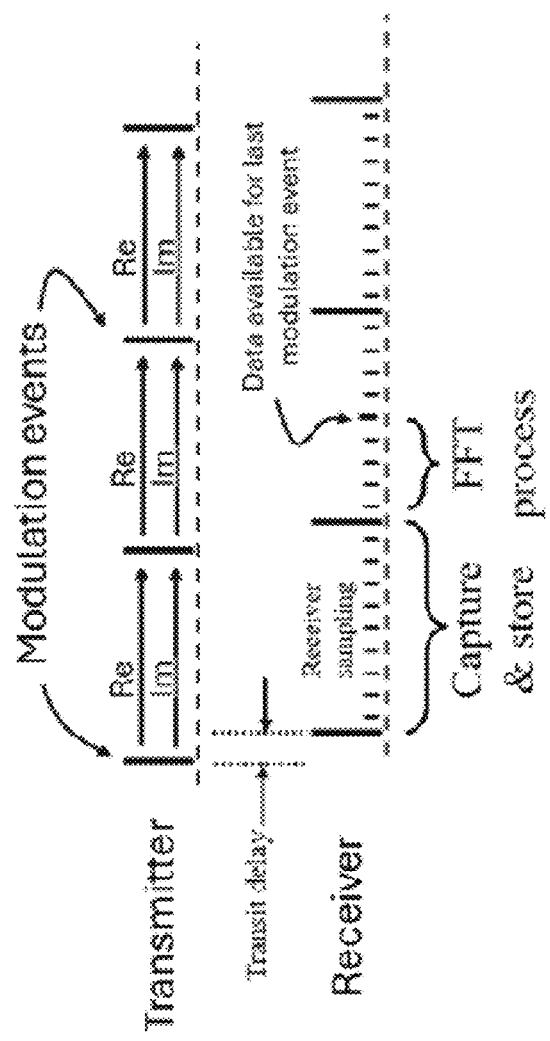
FIG. 3 (Prior Art) shows repeating modulation events where subcarrier phases & amplitudes are changed to represent a new bit grouping.

Electronics specifications sometimes refer to "radio", using just the single word, but a reader may not understand that "radio-frequency" or RF is probably meant, and an ordinary consumer-device e.g. AM/FM radio is not meant. To avoid any semantic problems, this disclosure will always use the expression "communication device using radio-frequencies" to avoid any such semantic problems.

Next, the embodiments herein are illustrated with a variety of chip-designs and chip-boundaries. It is noted that these Figures are for illustration only, merely to convey core concepts, and that the embodiments herein could be implemented in various ways not exactly like what is shown in the Figures. Thus, the specification and illustrations using the words "FPGA", "module", and other phrases, these are meant merely to convey concepts and not be limiting.

Along these lines, certain of the Figures herein may slightly differ in chip-arrangement, or reference various electronic components or elements in a way that may at first glance seem contradictory to another Figure. Again, this disclosure has a lot of complex concepts to convey, so it is sometimes necessary to use skeletal-depictions or summary-depictions, depending on the point and intent of that specific Figure.

Another issue is the use of IFFT (Inverse Fast Fourier Transform) and FFT, IQmixers, along with Kalman Filters, within this disclosure. The audience for the embodiments herein will likely have a very strong favorable disposition toward FFT, IFFT, and Kalman Filters, as these are time-honored, well-respected, and long-standing resources within the field of communication electronics. However, the embodiments herein strive to get the reader to re-think FFT, re-think Kalman, re-think IQmixers, in a more modernized context that factors in new improvements to traditional FFT and traditional Kalman resources. In order to make this transition clearer, and still be readable, this disclosure will sometimes use element-names of older-style resources e.g. Kalman, FFT, IFFT, IQmixer, but only so that a reader familiar with these concepts can follow the narrative flow of this disclosure using familiar reference points. However, the Kalman referred to herein will be overtly named as "modernized Kalman". Applicant's modernized Kalman will have different features, different purposes, and different processing capabilities as will be described in more detail elsewhere in this disclosure.

An advantage of such a modernized Kalman approach is that chipsets and support-chips and parts that expect Kalman-like behavior can still be used within the embodiments herein. However, certain portions can be removed, dispensed with, or obviated. Thus, this disclosure's references to modernized Kalman might also be read to mean "refurbished Kalman" or "repurposed Kalman". IOW, not all Kalman concepts are bad. Some portions of Kalman equipment are still quite usable and available at low cost. The embodiments herein leverage that usability.

Similarly, much time and attention and legacy-products in the communication electronics field still have an expectation of an IFFT-FFT pairing, also still have an expectation and affection for IQmixers. Applicant's position is "why fight that"? Instead, the embodiments herein leverage all this earlier equipment and chipsets, their low cost and legacy-standing, but utilize them in a new and more effective way.

Next, there exists a new class of communication chips called "Mixed Signal" chipsets, and no this does not refer to marriage counseling. In such a case, something like the ADC 413 and some other types of processing might be built into a specific chip. For example, the Analog Devices chip (AD9084) has 4 channels of transmit and receive with integrated ADC and Digital Signal Processing (DSP) support for each channel. This chip can also be connected to a separate FPGA. Also, various Intel RF processing chips have built-in FPGAs for the digital processing.

Figures 4A, 4B:
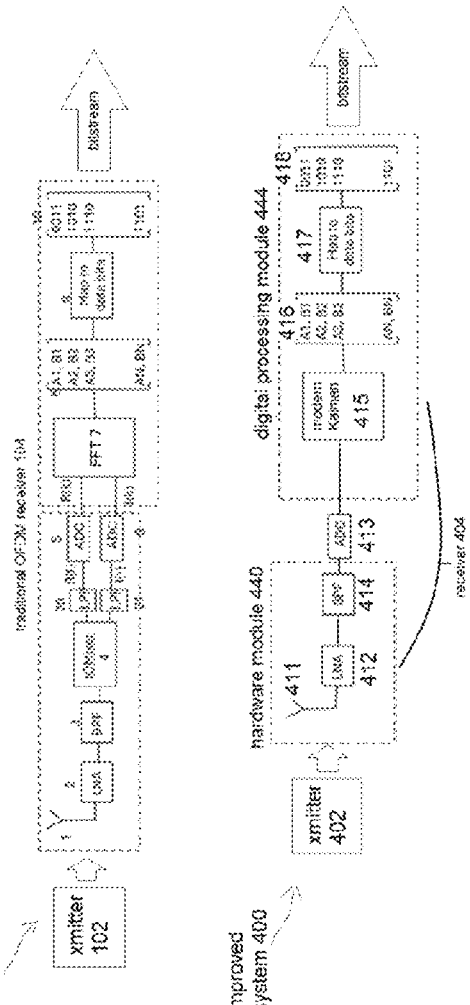
FIG. 4A (Prior Art) shows more detail of the receiver of FIG. 1.
FIG. 4B shows an example embodiment of a modernized communication system according to the embodiments herein.

Again, all this is to support the concept that the embodiments herein can be implemented a lot of different ways, and thus the drawings herein e.g. the system 400 of FIG. 4B, should be considered as guidance but not be considered limiting.

End Notes on Semantics and Architecture

FIGS. 4A-4B are intentionally shown in the same frame, for convenient comparison and printing. FIG. 4A (Prior Art) shows more detail of the receiver 104 within the FIG. 1 Prior Art system 100, while FIG. 4B shows an example embodiment of a system 400 having an improved receiver 404. Similar embodiments may be used at the transmitter (not shown).

The system 400 of FIG. 4B modifies the conventional OFDM systems 100 of FIGS. 1-3 and 4A in at least 5 ways.

1) Does not use OFDM at all;
2) Uses IFFT at transmitter but does not use FFT at receiver;
3) Modernizes usage of Kalman hardware in a new novel way, breaks away from traditional Kalman-mindset, yet retains some Kalman-aspects;
4) Avoids transmitting two independent time-histories, thereby freeing up considerable resources; and
5) Processes receiver-sampled data incrementally, rather than the earlier conventional "all processing comes at the end" style.

Regarding 1), the various systems 400, 1100, others herein avoid OFDM entirely, which is a considerable savings of chip-space, power, and removes a lot of overhead and wasted processing normally required when using OFDM.

Regarding 2), the traditional IFFT-FFT pairing can be scrapped, yet some low cost IFFT-FFT chip-sets that are trustworthy and reliable, having long years of reliable use, can still be implemented within the embodiments herein.

Regarding 3), similarly, Applicant is not trying to entirely displace Kalman concepts, but instead modernize Kalman and thus leverage the huge legacy-library of Kalman chipsets, processors, and support devices.

Regarding 4), the system 400 avoids transmitting two independent time-histories (avoids transmitting the Real and Imaginary), which will in turn enable doubling the transmitted data within a fixed frequency allocation. This doubling is accomplished by using only one data path (e.g., the real) to contain the A, B data and then using the now-available second data path (the imaginary path of the IQMixer) to contain a completely separate and independent A, B dataset representing another bitstream.

Figures 7A, 7B:
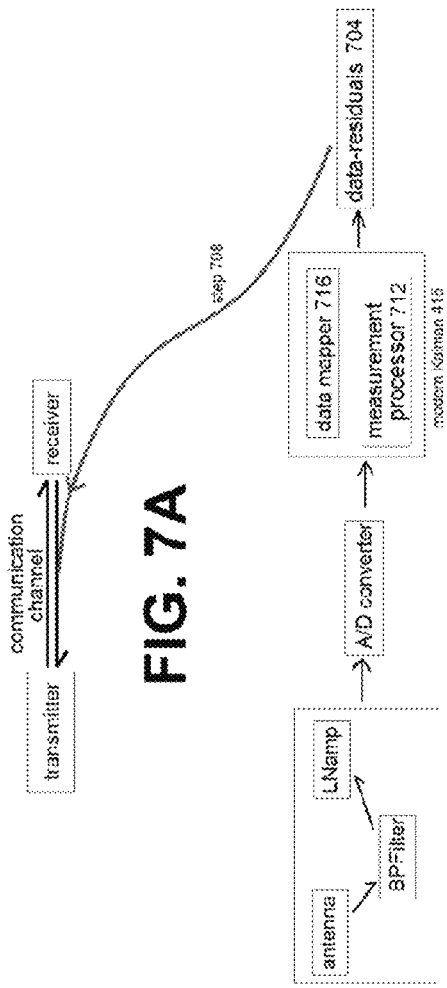
FIGS. 7A-7B show details of the modern Kalman including generating data-residuals.

Finally, regarding 5), the system 400 processes the receiver-sampled data incrementally (as the data is sampled) which will allow both new insights into the channel's disruptive behavior, as well as faster availability of the encoded bitstream. Each incremental processing step includes differencing the predicted signal measurement and the actual measurement (the data-residual 704), which offers a very useful characterization of any unmodeled errors introduced by the channel. As stated, a visual representation of what is meant by data-residual 704 is shown in FIGS. 7A-7B.

This is somewhat similar to how a good presenter does not force an audience to sit there and listen for 50 minutes, and then only take questions at the end. Instead, a good presenter will take and acknowledge some questions during her flow, make adjustments during transmission, yet still cover all her main points yet better-customize the data-flow to audience-concerns. The embodiments herein adopt a similar flexible mindset regarding information-quality, and quality of data-flow.

FIG. 4A (Prior Art) shows the traditional OFDM communications receiver 104. In conventional OFDM devices, the antenna (1) and RF frontend hardware devices are customized to the communication system. A Low Noise Amplifier (2) hardware device amplifies the antenna signal, and a hardware bandpass filter (3) further restricts the amplified signal to the desired bandwidth containing only the frequencies of interest. The filtered signal is inserted into the IQMixer device (4) where it is split into two channels that are shown as the real (R(t)) and Imaginary (I(t)) channels. The IQ mixer (4) downconverts both signals to a baseband frequency where traditional (reduced capability) Analog-to-Digital Converter (ADC) devices can operate. Both time-history channels are separately inserted into analog-to-digital converters (5) and (6), resulting in digital signals (R(k)) and I(k)).

The digital real and imaginary signals (having N digital samples where N is the number of subcarriers) are then inserted to a Fast Fourier Transform (FFT) processor (7) that results in N A, B complex coefficients (8) that represents the phase and amplitude of the N subcarriers that form the OFDM multicarrier waveform. Each of the N complex coefficients are mapped into a bit pattern 0010. A 4×4 grid pattern of 16 A, B values can map each A, B pair into a unique 4 bits. The A, B grid pattern mapping (9) into bits is referred to as a constellation—current OFDM systems can have grid patterns as large as 32×32 so that 1024 bit patterns can be represented by each modulation cycle. Each of the N subcarriers within the OFDM multicarrier waveform is encoded with a unique A, B complex coefficient. Thus, within this disclosure, convention (non-italic) A, B will refer to grid values. Italic A, B will refer to their complex conjugates.

OFDM waveforms were useful at one time, but modern signal analysis shows that OFDM has too much overhead, too much waste, and is so antiquated with a "locked in" mindset that even simple transmissions are subject to excruciating review and checking. An example of OFDM disappointment its treatment of multipath. The old antiquated OFDM products used a Cyclic Prefix where a modulation cycle is extended by appending a portion of a modulated waveform. For example, the 802.11ac protocol extends a modulation period from 3.2 microsecs up to 4.0 microsecs for a reduction in datarate of 25% in order to counter multipath interference. This modulation period extension is done even if there is no multipath present. That is bad, because processing time is lost, computing power is wasted.

For the modern Kalman 415 embodiments, it is possible to increase the estimation samples by discarding some early samples because they contain discontinuities that do not fit the underlying multi-carrier waveform. The modulation period is extended but only adaptively if multipath is determined to be present.

FIG. 4B shows an example system 400 wherein a receiver 404 has an ADC 413 which is moved closer to the antenna 411 and immediately after the Band Pass Filter (BPF) 414 and Low Noise Amplifier (LNA) 412. This removes various hardware devices from earlier designs e.g. the receiver 104 shown within FIG. 4A. and allows a single radio-frequency design to be used for multiple applications as shown in e.g. FIGS. 8A-8B. This could include e.g. a Starlink system (at e.g. 10.7 GHZ) or an Internet router (at e.g. 2.4 GHz) connected to a conventional ISP. IOW, the single radio-frequency receiver 404 might be usable for both e.g. a Starlink arrangement, and/or an Internet router, either one requiring minimal change to the hardware modules used in FIG. 4B.

A key feature to notice about FIG. 4B is the absence of the FFT (7) shown directly above in FIG. 4A. In FIG. 4B, the FFT (7) is replaced by a modernized Kalman Filter recursive processor 415. This will be referred to as modern Kalman 415. The FFT mechanization of OFDM within FIG. 4A requires the input of both the real and imaginary components, whereas the modernized Kalman 415 operates on only one single real signal which thus can be sampled at a higher rate.

Within FIG. 4B, the non-FFT receiver 404 operates the ADC 413 at a higher datarate than in FIG. 4A (Prior Art). Available radiofrequency ADC devices can sample up to 20 Gsps (AD9084), while earlier FFT-constrained mechanizations including but not limited to the receiver 102 (FIG. 4A) must sample the subcarrier based solely upon the subcarrier frequency spacing.

The embodiments herein, including but not limited to the example system 400, will use a non-traditional, modernized Kalman 415 (hereinafter referred to as modern Kalman 415) for decoding the A, B coefficients 416 from a single sampled signal. Mapping into bits 417\418 can emulate what is done within a traditional OFDM, so that within the embodiments herein, some components do not need to change, some downward compatibility is maintained. However, a difference is that the Kalman Filter 415 operates only on a single sampled signal from the antenna 411 and thus does not require any IQ mixer to generate the real and imaginary components as required by e.g. the FFT 007 of FIG. 4A (Prior Art). This removal of the requirement for the conventional IQ mixer (4) and obviating of the various real/imaginary features saves significant processing time and reduces power consumption for what was already a cost-minimized receiver 400.

Further, the receiver 400 does not have any FFT component. IOW, the embodiments herein may (optionally) utilize an IFFT at the transmitter side, but remove any requirement for an FFT at the receiver side. An example of such an arrangement is shown in FIG. 11.

The following applies to the system 400 of FIG. 4B, but also may have application to various of the other embodiments described herein, where applicable, including e.g. systems 500, 504, 1100, and others. The antenna/BPF/LNA will all be in the "RF frontend" to set up the signal that is fed into the ADC 413.

The Band Pass Filter (BPF) 414 attenuates neighbor communication signals thus doing a type of noise-reduction. What's left gets amplified by the LNA to produce a voltage input to the Analog to Digital Converter ADC 413 in the range of (for example)+/−3.3V.

Figure 11:
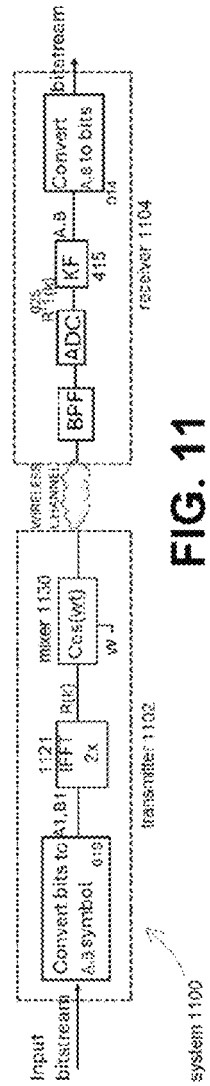
FIG. 11 shows a single stream non-OFDM system.

Another change from traditional is the repurposed mixer 1130 at the receiver (starting e.g. within FIG. 11 and other embodiments). Specifically, repurposing an IQMixer to transmit an independent second data path effectively doubling the datarate. Thus, for convenient reference, Applicant's repurposed IQMixer will hereinafter be referred to as repurposed-IQMixer or just mixer.

The modern-Kalman Filter 415 enables subsampling of the RF waveform so that the digital sampling and data processing can occur at frequencies well below a chosen carrier frequency. The multicarrier signal model that is used by the modern-Kalman Filter 415 represents a sum of multiple subcarriers that are frequency-spaced about that carrier frequency.

The mathematical models of multi-carrier waveforms underlying the modernized Kalman Filter 415 can be preconfigured within e.g. firmware of the data processing unit 444 (FIG. 4B). An important point is that the modernized Kalman 415 allows a subcarrier frequency layout where the frequencies need not be equally spaced. The digital sampling rate of the antenna signal is thus not coupled to the subcarrier frequency spacing as is the case for a Prior Art OFDM arrangement e.g. FIG. 4A (Prior Art) or FIG. 10 (Prior Art).

It is advantageous to uncouple digital sampling rate from subcarrier frequency spacing at least for the following reasons: 1) higher than OFDM-required sampling rate will offer reduced sensitivity to channel- and sample-induced noise; 2) inclusion of extra samples will allow removing (skipping the processing of) any large-amplitude samples, which in turn relaxes dynamic range requirements for the ADC and LNA; and 3) faster sampling will allow more rapid determination of channel disturbances (e.g. multipath delay spreads).

The various new designs herein in some instances entirely replace the FFT (7) within the Prior Art receiver 104 with the modern Kalman Filter 415. The state-space model perfectly represents the multicarrier waveform and the models are linear with Gaussian additive noise. The modern estimation methods used are optimal under these conditions. Optimality indicates that there can be no better estimation configuration in either speed of response or converged accuracy.

Modern Kalman 415

Prior to moving on to FIGS. 5A-5B, some discussion of modernized Kalman concepts is now appropriate. The modernized Kalman Filter 415 is based upon a statistical model of the underlying dynamic system (e.g. a multicarrier waveform). This state-space model uses a $2^{nd}$-order linear differential equation (simple harmonic motion) to represent each subcarrier. The A, B terms for each subcarrier are the unknown terms inherent to the solution of any second order differential equation. The measurement model for the modern Kalman 415 is formed from the sum of the N subcarriers with additive noise. These linear dynamics allow prediction of the covariance matrix of A, B parameters "on the fly" i.e. modern Kalman 415 processing is occurring.

It is now possible to express the covariance propagation portion of the modern Kalman 415. Because the system(s) 400, 500, 1100 are represented by linear models with gaussian measurement noise, the predicted statistics for the A, B estimation will be both accurate as well as optimal. These predictive statistics of the estimation problem can be computed independently from any actual measurement processing. That is, it is not necessary to perform the actual estimation using simulated noisy data, but merely to determine the evolving statistics of the estimation. This is a big difference, as determining evolving statistics can be done much faster and more efficiently than performing an actual estimating using noisy data.

The modern Kalman 415 uses methods customized to a specific underlying state space model. The processing can be further simplified by recognizing that a transition matrix for propagating the state between measurements is in a block-diagonal form. The transition matrix for the N-subcarrier model will have 2×2 submatrices, one for each subcarrier, along the diagonal. Also, the measurement matrix has only alternating ones and zeros which significantly simplifies its processing.

The modern Kalman Filter 415 has two parallel sequences: One sequence (used during design (set-up) of a communication system e.g. system 400, 1100, other) propagates the covariance matrix for the system states and defines the Kalman Gain. The second sequence (used during actual operational measurement processing) uses the stored Kalman Gain to update the states at each measurement using the data-residuals 704 outputted from the modern Kalman 415.

The following procedures summarize various aspects of the modern Kalman 415 and its configuration and processing:

During Design (Set-Up):
  Propagate a covariance between measurements;
  Update covariance at each measurement;
  Compute and store a Kalman Gain at each measurement;
Operational Processing (Actual Use):
  Propagate the state between measurements;
  Extract the Kalman Gain from stored memory;
  Update the state at each measurement;
  Assess the data residuals 704 to detect irregularities within the channel (FIGS. 7A-7B).

Figure 9:
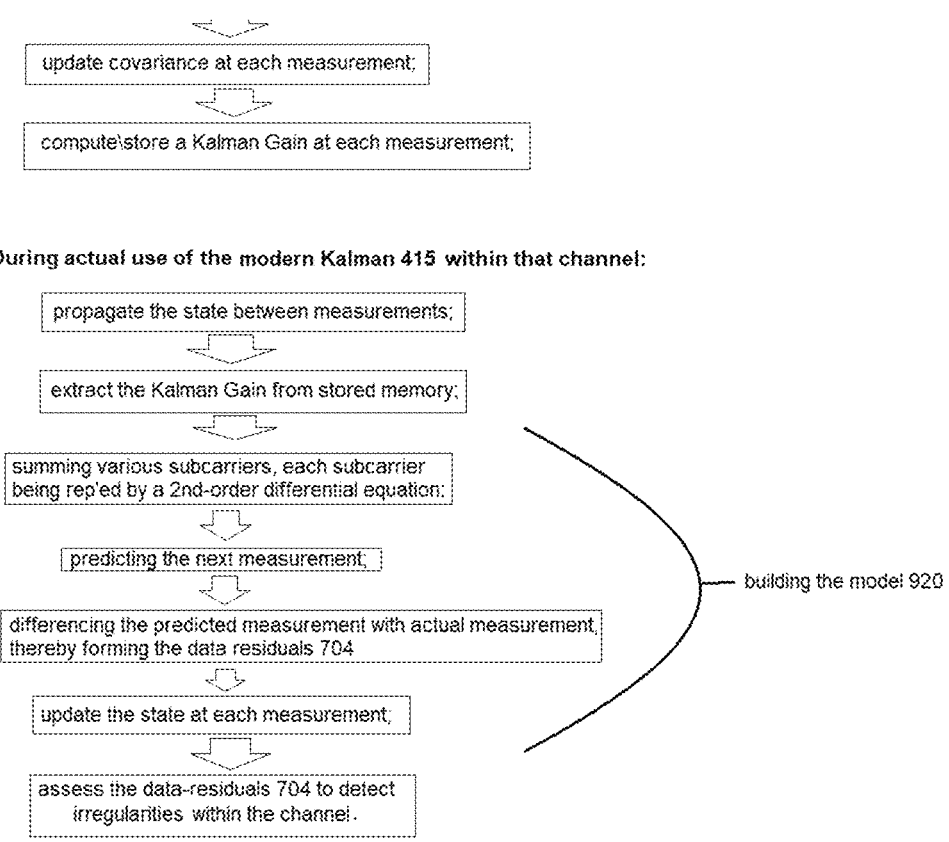
FIG. 9 shows a flowchart of various modern Kalman aspects.

A visual representation of data residuals 704 and where they exist in relation to a modern Kalman 415 is shown in FIGS. 7A-7B. A flowchart of various Kalman aspects is shown in FIG. 9.

It is possible to initialize the covariance propagation at the start of each modulation cycle using a diagonal covariance matrix with large values on the diagonal and zero off-diagonal to represent complete uncertainty in the initial signal state. During the course of processing for each symbol, a set of Covariance Matrix diagonal elements are reduced to a level that is controlled by the measurement standard deviation value that was assumed during the design (set-up) stage (FIG. 9).

The above procedure will provide optimal estimation for the individual subcarrier signal and signal rates assuming that the statistical model is correct. However, the goal for each symbol processing is to estimate the A, B QAM grid points and not the signal and signal rates for each subcarrier. The signal and signal rates can be easily expressed in terms of the A, B coefficients of the Cosine and Sine. This linear expression can be solved for the A,B values as a function of the signal and signal rate. Because the expressions are linear, the covariance matrix for the A,B terms can be readily defined using the covariance matrix for the signal and signal rate. Thus the embodiments herein allow for a design stage where the Kalman Gains are established in terms of only (a) the subcarrier frequency layout, (b) the assumed channel noise standard deviation, and (c) the digital sampling pattern.

Additionally, the Kalman Gain (e.g. 2N values per sample time) can be stored during this design stage or later use during the processing of the actual measurements. Further, a digital sampling pattern does not need to be related to the subcarrier frequency layout. Nevertheless sufficient samples must be collected so that the standard deviations of the A,B values are reduced to low levels. It is known that for N subcarriers with an A, B value to be estimated for each subcarrier, that there must be at least 2N measurements. That is, the modern Kalman 415 must, as a minimum, have the same number of digital samples as there are unknown values. Within the modern Kalman 415, it is desirable to have an overabundance of samples. That is, more than 2N samples is preferred in order to allow a better assessment of the channel noise behavior during the symbol sampling. This higher than minimum sampling rate can be achieved due to capabilities of modern ADC technology.

With this over-abundance of measurements, the system 400 and other systems herein allow for skipping any detected measurements that are larger than a predetermined threshold. It is known that a large dynamic range for the processed measurements will demand a large dynamic range for the ADC. For example, a 16-bit ADC will provide better results than an 8-bit ADC, but at a higher cost. The embodiments herein permit and facilitate skipping measurements known to have large values, thereby enabling better performance from lower-cost (fewer bits/sample) ADC devices, but doing so without reduction in the accuracy of the A,B estimates. This in turn means that the systems 400, 500, 1100, other, can be built at lower cost than Prior Art OFDM systems.

Two receiver design options are shown in FIGS. 5A-5B. Both of these utilize only the single (real) sampled signal rather than requiring real and imaginary sampled signals. This is helpful because the IoT market emphasizes extreme low size-weight-power (SWaP) due to the large deployed sensor base where each sensor must communicate to a central site. In such a market, less emphasis is placed on high datarate.

FIG. 5A shows a minimal cost radio-frequency receiver 504A comprising only an antenna, LNA and signal processor.

Figure 6A:
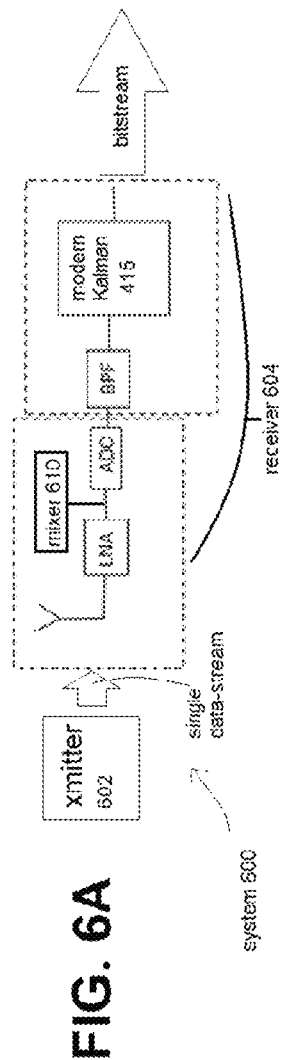
FIG. 6A shows an enhanced embodiments having minimal cost, size, weight and power-consumption (SWaP)
Figure 6B:
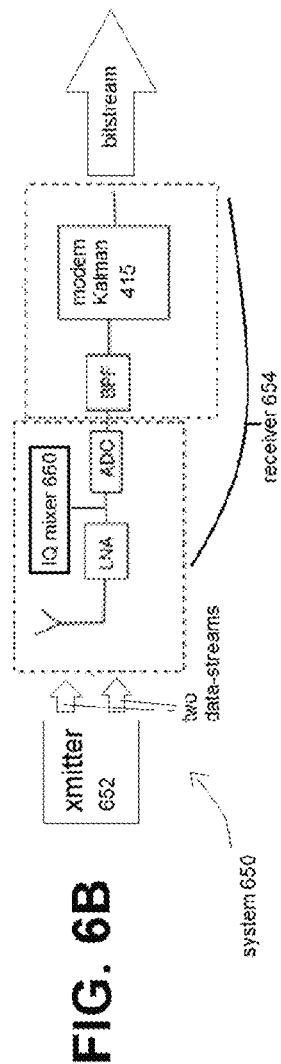
FIG. 6B shows a maximum datarate system including re-purposing an IQMixer.

An alternative receiver system 500 is shown in FIG. 5B, in which mechanizes an IQ signal separation into two independent signals S1 and S2 and process each independently—thereby enabling a 2× improvement in datarate yet maintaining the same preconfigured bandwidth as expected by an established communication system e.g. Starlink vendor (FIG. 8A), or an ISP (FIG. 8B) that provides the Internet routers to a particular location FIGS. 6A-6B shows two enhanced embodiments, system 600 (FIG. 6A) and system 650 (FIG. 6B). The system 600 of FIG. 6A shows a minimal cost, size, weight and power-consumption (SWaP) example. This would be suitable for environments with thousands of fielded TX/RX devices—e.g., an IOT (Internet of Things) arrangement.

The system 600 uses just a single mixer 610 at the transmitter 602 and has just a single datastream. The receiver 604 would have no mixer. Thus, no downconversion would occur. Instead, the receiver 604 would just sample the RF to obtain the necessary information. This is known as Direct RF.

Meanwhile, the system 650 from FIG. 6B would be a maximum datarate system, re-purposing an IQMixer 660 within the transmitter 652 and sending two independent datastreams to the receiver 654. This would double the datarate, but with a bit more cost and a bit more SWaP (size, weight, and power) requirements.

FIGS. 7A-7B attempt to show another advantage of the modern Kalman 415, specifically its ability to generate data-residuals 704. In step 708, the data-residuals 704 are applied to the communication channel data-stream between the various transmitters (e.g. 402, other) and receivers (e.g. 404, other) described herein. The data-residuals 704 are a difference between the predicted measurement (from the system multicarrier model) and the actual noisy measurement from the ADC sampling along with the measurement processor 712, available upon processing each successive measurement. These data-residuals 704, for a measurement process that is well represented by the system model, have a characteristic signature: the residuals are a white sequence (i.e. they are uncorrelated from one measurement to a following measurement) and their standard deviation is well-predicted by the assumed measurement noise. Some channel errors and other system model errors will have a predictable signature that is detectable from the process of extracting the data-residuals 704. If the underlying system model is incorrect, then the data-residuals 704 will have a different but detectable behavior.

For example, multipath may exist, which could cause a second delayed signal path, due to reflections inherent within multipath. These delayed signals will result in a discontinuity in the received signal as the signal's discrete modulation event is also delayed. This discontinuity will be visible in the data-residuals 704 as a sudden and large spike. If such an event is detected, the signal transmission can be extended by an amount based upon the detected multipath delay.

The design of the modernized Kalman 415 is based upon the statistical model of the dynamic system and the measurements made upon the states associated with the dynamic system. As shown in FIG. 9, the modern Kalman 415 uses a dynamic model 920 comprised of the summed subcarriers with each subcarrier represented by a second-order differential equation. During operation, this model 920 is used to predict the next measurement and then the predicted measurement is differenced with the actual measurement to form the data residuals 704. For a well-performing modern Kalman 415, the residual process will be white—meaning that the data-residuals 704 are not correlated in time. Moreover, the residual one-sigma boundary is well-predicted by the information saved during the design (set-up) stage of the modern Kalman 415 (see FIG. 9). At each measurement, the dynamic model state is updated by adding a term formed from the residual multiplied by the Kalman Gain. As discussed in FIG. 9, the Kalman Gain is also stored during the design (set-up) stage.

The data residuals 704 being non-white (i.e. showing sign of correlation) or the data residuals 704 being one-sigma higher or lower than as predicted by the design (set-up) stage suggests that the underlying model 920 is incorrect. One obvious error is that values of data residuals 704 are too high or too low with respect to the predicted one-sigma boundaries. In this case, measurement noise for the underlying model 920 should be revised.

Of more interest, a multipath error will result in a large residual error at the time when the delayed reflected signal is received. This can be observed in processing the data residuals 704. In such a case, the transmitted signal can be extended so that a portion of the signal that behaves according to the multicarrier model can be processed. This allows adaptive measurement of a delay spread of the multipath, as well as a way of compensating for this delay spread.

Re-Statement of Some Advantages

The various system(s) 400, 500, 504, 1100, and others described herein can, in some embodiments, facilitate communication datarates being doubled. One key change of the embodiments herein over existing OFDM systems is to remove the requirement for using the two channels afforded by any IQMixers for transmission of the real and imaginary output from an IFFT (see FIG. 4A as one non-limiting example). The two channels (real and imaginary) are replaced by a single real channel that is sampled at twice the data rate as for the real and imaginary configuration. This frees up the various IQMixer components for transmitting two independent streams with each stream operating as independent datapaths carrying similar datarates.

Figures 8A, 8B:
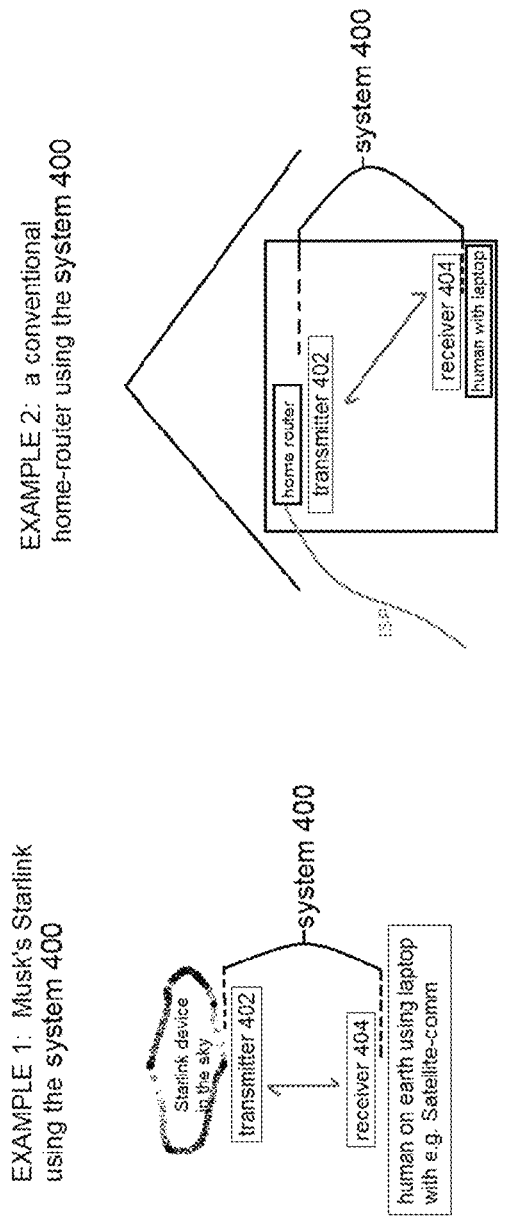
FIGS. 8A-8B show a single radio-frequency design being used for multiple applications including a satellite communication system (FIG. 8A) and an Internet router (FIG. 8B)

As shown at least within FIGS. 8A-8B, this benefit would apply to e.g. a Starlink implementation, an ISP home-router implementation, or literally hundreds of other types of implementations. The only penalty will be within the ADC 413, as there would be a requirement for a faster sampling rate. Modern ADC digital sampling devices are known to have capability far exceeding that required for legacy OFDM.

Figure 10:
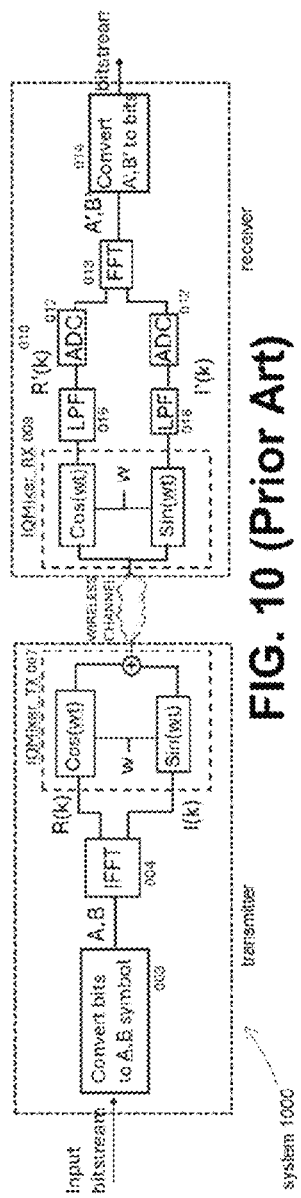
FIG. 10 (Prior Art) shows another implementation of a legacy OFDM system.

FIG. 10 (Prior Art) shows another implementation of a legacy OFDM system 1000, and FIG. 11 shows another way of viewing Applicant's various non-OFDM embodiments, in the guise of a system 1100. These two Figures are placed close together for convenient reference, and also because both have a single communication stream. FIG. 10 (Prior Art) shows a legacy OFDM System 1000. FIG. 11 shows a single stream non-OFDM system 1100.

FIGS. 10 and 11 are not meant to supplant FIGS. 4A-4B, nor be contradictory, but instead provide another perspective, and another way of understanding the embodiments herein.

Both systems 1000 and 1100 communicate a single bitstream across a wireless channel and both systems convert the input bitstream 1001 into a set of QAM A, B grid pairs 1003 that define the phase and amplitude of a set of N subcarriers generated at the transmitter 1002. However, within the FIG. 10 Prior Art implementation of the system 100, for OFDM, the A, B pairs are the input to an N-order IFFT 1004 resulting in N real 1005 and N imaginary 1006 time-history digital samples at baseband. With OFDM, the time-history samples are spaced in time at exactly the inverse of the frequency spacing of the N subcarriers. This rigidity and non-flexibility is required in order to satisfy the requirements for the IFFT.

Meanwhile, within the system 1100 (FIG. 11), the A,B pairs are also input to an IFFT at the transmitter—but this is a different IFFT 1121 having an order of 2N rather than N—resulting in a real-only output emerging from the IFFT 1121. The extra N terms in the A,B vector are formed from the complex conjugate of the original OFDM's N terms so as to ensure a real IFFT output from the 2N-order different IFFT 1121.

Similarly, the system 1100 also has a "mixer", but it's not an IQMixer. Instead, the mixer 1130 is different from the IQmixer 1007 (TX) and also the IQmixer 1009 (RX) in that it's not part of a TX\RX pair. But that is not the only difference.

Within OFDM in general and within FIG. 10 in particular, the real and imaginary time-histories at the transmitter are input to the IQ mixer 1007. At this point, both signals are upconverted to a carrier frequency (w), summed, and then sent across a wireless channel 1008. This is a lot of extra work, by the way. At the receiver 1004, the received signal is input to another IQ mixer 1009 which recreates the original real and imaginary time-histories (at baseband)—but also adds interfering components at twice the carrier frequency. The Low Pass Filter (LPF) 1016 removes these high frequencies leaving the original transmitted real and imaginary signals at baseband. The OFDM time-histories must be sampled at the subcarrier bandwidth, as required by the FFT again being somewhat rigid and inflexible, and then input to the receiver's FFT 013 in order to recover the original A, B terms and the bits that form the bitstream 014. Such forced sampling at the subcarrier bandwidth acts as a bottleneck and does not allow for faster digital sampling that will offer performance benefits. Such faster sampling is well within the capabilities of modern ADC hardware.

The embodiment of FIG. 11 modifies the transmitter by forming a real-only waveform for the summed subcarriers. This requires the IFFT 1121 be a 2N IFFT and will result in 2N real time-history terms that are spaced at ½ the spacing for the OFDM datapoints. In this way, the system 1100 transmits a single real time-history of length 2N rather than the real and imaginary time-histories of length N (as in OFDM). The system 1100 has no requirement to maintain the separate imaginary time-history and therefore the upconversion by the non-IQ mixer 1130 (again, not an IQmixer, and also, not part of a pair of TX\RX mixers) due to using only a single channel versus the dual-channels for the OFDM configuration.

The system 1100 thus allows for significantly reduced component complexity for a given receiver, whether receiver 404, 504, 604, or 1104. The single-stream receiver will allow for direct RF sampling (032) at a rate that is below the carrier frequency (subsampling). This subsampling is treated exactly using the measurement prediction capability of the underlying modernized Kalman Filter 415 multicarrier model. As an example, a 20 MHz multicarrier signal centered around 2.4 GHz might be sampled at 120 MHz (20 times below the carrier) with the estimation performance unaffected by this subsampling.

Other than changing the digital sampling pattern, the modernized Kalman Filter 415 configuration is unchanged. As shown in FIG. 4B, a bandpass filter BPF 414 can sometimes be inserted closer to a receiver's antenna 411 to ensure that any neighbor communication systems do not interfere. The receiver 1104 doing RF subsampling replaces the requirements for downconversion as used within the OFDM implementation of FIG. 10. The subsampled RF digital samples are processed sequentially by the modern Kalman 415.

As stated, one disadvantage of FFT OFDM mechanization is that all the sampled data for a single transmitted symbol must be fully collected before any true processing begins (also known as batch processing). Meanwhile, the sequential processing shown in FIG. 11 using the modern Kalman 415 will serve two purposes. First, the distribution over time of the processing per-sample will offer computational efficiency benefits. That is, the processing hardware is continuously used but without the requirement to await all the data from a symbol transmission to be fully collected. Second, the sequential processing offers new information upon processing residuals for each processed sample so that unexpected waveform behavior introduced by the channel can be detected. For example, an elevated channel noise level can be measured and the modern Kalman 415 can be adapted "on the fly" to offer better noise rejection. Also, multipath effects on the received waveform can be detected and the receiver's processing window can be extended in an adaptive manner. The sequential output of the modern Kalman 415 will result in successively improved estimates of the A,B coefficients.

In the embodiment of FIG. 11, the transmitter 1102 is shown with an IFFT 1121. The subcarriers start at zero frequency (DC) and are incremented by a constant delta-frequency to get the next frequency(s). With legacy OFDM, if there are N frequencies/subcarriers (e.g., 64 frequencies spread over 20 MHz), then the IFFT for legacy OFDM will have an order of 64. This gives 64 "real" time-history datapoints and 64 "imaginary" time-history datapoints—two separate time-histories. These two time-histories are upconverted (to carrier frequency) and then sent across the wireless link using the two-channel IQMixer.

For some new embodiments e.g. the system 1100 of FIG. 11, a customized IFFT 1121 is located at the transmitter 1102—but it would be of order 2N so that the resulting "imaginary" time-history terms are exactly zero—leaving only the real terms to be transmitted. The 2N terms of the customized IFFT are formed from the N A, B terms as is used within a Prior Art OFDM mechanization, with the additional N terms formed from the complex conjugate of the original A, B terms. Thus the unused channel of the mixer 1130 (or, potentially, the unused channel of an IQMixer not overtly shown in FIG. 11) could then be used for a separate independent data channel to double the transmitted datarate.

Accordingly, any Quadrature Amplitude Modulation (QAM) and/or Forward Error Correction (FEC) that may be used for traditional OFDM systems can be re-purposed without modification in order to map the A, B terms into transmitted bits. Thus, downward compatibility is maintained. One example of such mapping is performed by the data mapper 716.

Figure 12:
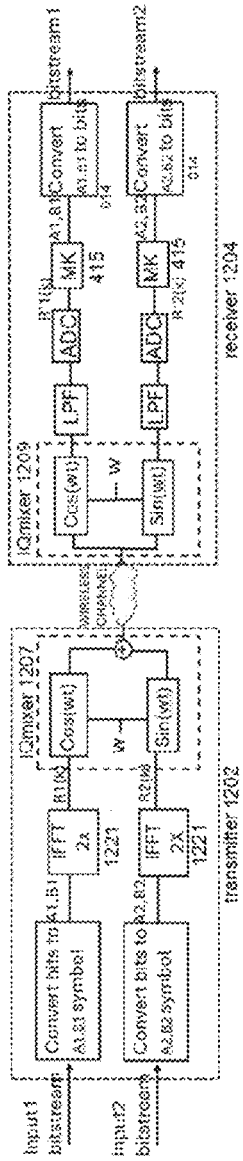
FIG. 12 shows a dual-stream embodiment of a system.

FIG. 12 shows a dual-stream embodiment of a system 1200. Interestingly, FIG. 12 brings back the IQmixer, in fact uses two IQmixers (not the earlier non-IQ mixer 1130). These are IQmixer 1207 (TX) and IQmixer 1209 (RX). Because the single-stream embodiment of the receiver for the system 1100 requires only a single real channel being passed through the transmitter 1202 and receiver 1204, the earlier implementation 1100 becomes scalable such that the dual-stream embodiment 1200 can be built therefrom, combining e.g. two systems 1100. Within FIG. 12, two independent bitstreams are transmitted using parallel paths through the transmitter and receiver. In the embodiment of FIG. 12, the transmitter 1202 is shown with a pair of IFFTs 1221. The repurposed IQMixers 1207\1209 are configured to process the two independent bitstreams, thus allowing for a doubling of the datarate for the system 1200.

Figure 13:
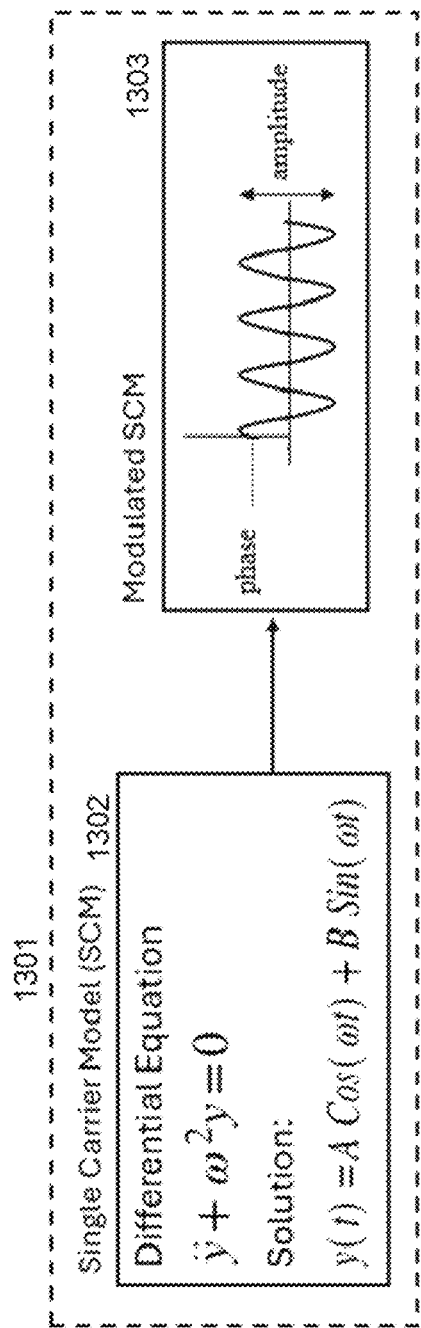
FIGS. 13-14 show details and applications of a modern Kalman device.
Figure 14:
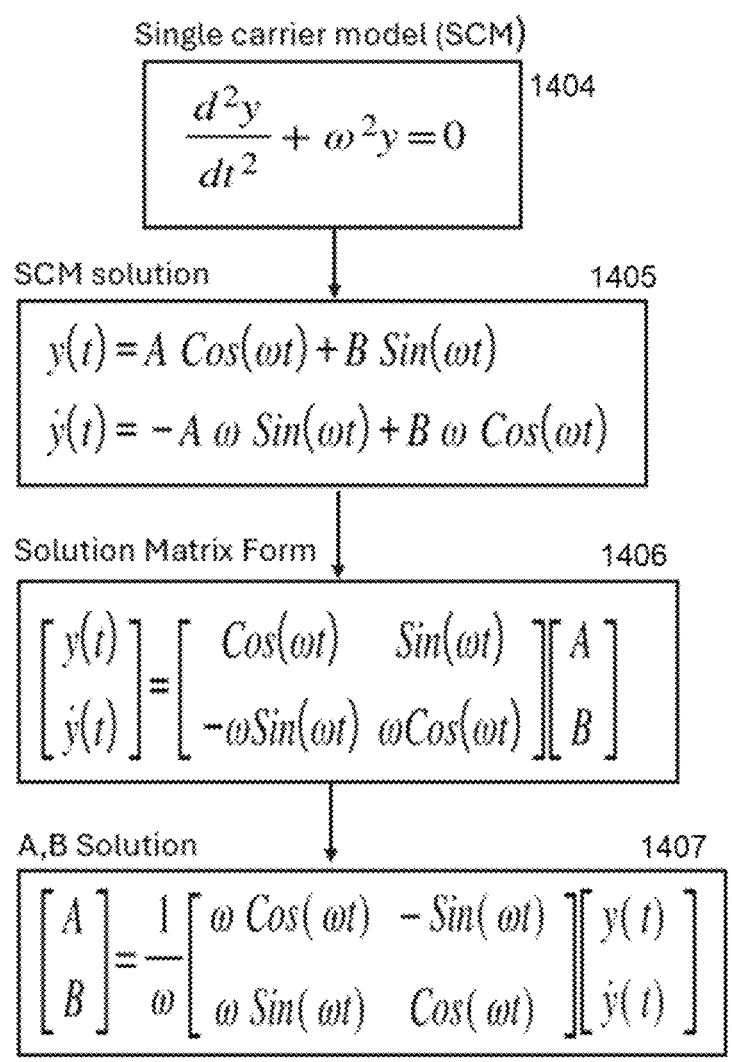

More value and applications of the modern Kalman 415 is discussed in FIGS. 13-14. Afterwards, FIG. 15 then shows an example multi-carrier system 1500.

FIG. 13 shows a potential Single Carrier Model (SCM) 1301 usable by the modern Kalman 415, and FIG. 14 shows A and B coefficients from the signal and the signal rate. The MKF 415 uses a differential equation with two dynamic states: y and a time-derivative of y. These states can both be propagated forward in time using methods for solving the differential equation. The single-carrier differential equation 1302 has a solution block 1302 that will include two arbitrarily selectable parameters, A and B (block 1405 shown in FIG. 14 but not in FIG. 13). The parameter A is the coefficient of the cosine and B is the coefficient of the sine where the argument of the cosine and sine is the carrier frequency (w) times the time (t) 1302. This is a generalized representation of an oscillating wave 1303 which allows definition of a specific phase and amplitude 1303. This $2^{nd}$ order differential equation is also known as simple harmonic motion. The phase and amplitude (1303) of each subcarrier can be computed in terms of the coefficients A and B. These A, B terms are the same terms previously used to describe the modulation of the multicarrier waveform.

The MKF 415 will provide estimates of the carrier signal and the time-derivative of the carrier signal. However, the communication system will require estimates of the A and B coefficients which are modified on each modulation cycle using a QAM grid pattern. The A and B coefficients are directly related to the signal and its time-derivative shown in FIG. 14. The differential equation 1404 for a single modulated carrier has a time-history solution 1405 in terms of coefficients A and B yielding expressions for the oscillating signal and the time-derivative of the oscillating signal 1405. This can be stated in a matrix form 1406 as is required by the modern Kalman 415. The matrix form 1406 can be inverted to solve for the desired A, B parameters in terms of the signal and its signal rate 1407. Thus as the modern Kalman 415 estimates the signal and its signal rate on each receiver digital sample. As such, the A and B parameters for the modulated carrier can also be estimated.

The embodiments herein can be implemented in a variety of ways, including but not limited to FPGAs (not shown). One key uncertainty is the computational burden of the proposed solution on hardware such as an FPGA. Fortunately, due to the various configurations of modernized Kalman 415 described herein, the computations are straightforward and rely on vector products that are well-suited for FPGA mechanization.

Another advantage is the Kalman Filter 415 computations are incrementally spread across the modulation cycle, rather than occurring at the end of a cycle after all samples are recorded. This results in improved data-throughput and reduced latency.

Figure 15:
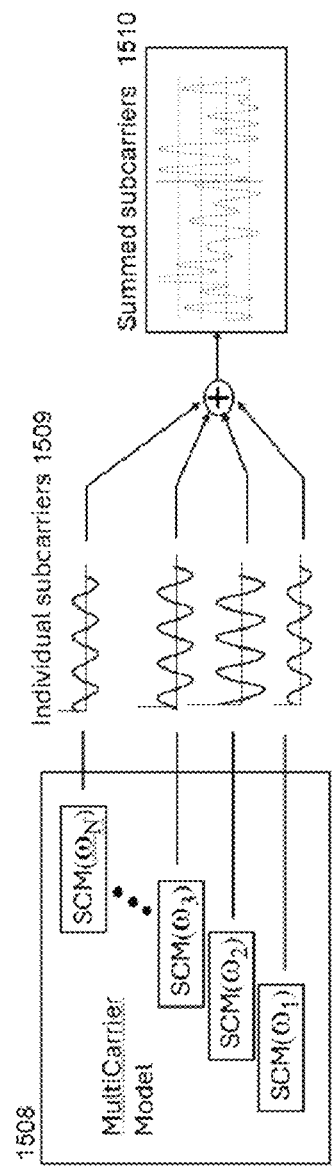
FIG. 15 shows an example multi-carrier system.

The differential equations for the modulated oscillating carrier and corresponding generalized solutions from FIGS. 13-14 are suitable for representing a single modulated carrier. However, in fact, a communication system can be devised that is formed from such single carriers along with its modulation scheme. FIG. 15 will explain this.

As stated, high-rate digital communication systems (such as OFDM) can implement multi-carrier mechanisms. Multicarrier systems use a set of modulated carriers (subcarriers) that are distributed in frequency about some frequency offset. For example, a common communication system may use 64 separate modulated carriers that start at a frequency of 2.4 GHz and are spaced over 20 MHz. Each of the subcarriers are separately modulated using a modulation scheme such as QAM.

FIG. 15 shows an example multicarrier SCF (single carrier frequency) system 1500 formed from multiple single carrier models. As shown in FIG. 15, an SCF system 1500 uses a multi-carrier model 1504 formed from groups of single carrier models 1508 where each of the individual subcarriers have a different frequency 1509 that is known to the receiver 1504. At the transmitter 1502, the individual A, B parameters for each frequency are each mapped to a bit-sequence. The length of the bit sequence is dictated by the order of the QAM modulation. The individual subcarrier real-valued waveforms are summed 1510 at the transmitter 1502 in order to form a composite signal containing all subcarriers. The composite signal is amplified at the transmitter and sent across a wireless channel to a receiver.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

The invention claimed is:

1. A method of operating a non-FFT communication system having a transmitter, a receiver, and a communication channel, the receiver comprising:
   an antenna to be in direct communication with a Band-Pass Filter (BPF) and then followed by a Low Noise Amplifier (LNA);
   wherein the antenna, BPF, and LNA are located in the same hardware module and are followed by an Analog to Digital Converter (ADC) and a processing unit which communicates with the BPF; and
   the ADC to be in direct communication with a modernized Kalman device;
   the method comprising using the modernized Kalman device to estimate data received from the transmitter including:
   configuring the modernized Kalman device to achieve a predetermined type of data-mapping and building of data-models;
   configuring the modernized Kalman device to achieve the predetermined data-mapping while avoiding any real/imaginary components and without an FFT;
   Kalman Filtering using incremental measurement processing by the modern Kalman device, thereby giving rise to one or more data-residuals;
   utilizing the one or more data residuals as a signature for identifying channel behavior; and
   making adjustments to the system based on the data-residuals.

2. The method of claim 1, further comprising:
   removing, by the BPF, nearby interfering signals from the communication channel.

3. The method of claim 2, wherein the ADC is positioned near the output of the antenna and the LNA.

4. The method of claim 3, further comprising:
   configuring the BPF and LNA to work together to restrict voltages at an input side of the ADC such that these input voltages will always be within a predetermined voltage range.

5. The method of claim 4, further comprising:
   the predetermined voltage ranging between 0V--3.3V.

6. The method of claim 3, further comprising:
   configuring and operating the receiver at a flexible sampling pattern, thereby allowing for skipping any detected measurements that are larger than a predetermined threshold thereby reducing a peak-to-average-power ratio (PAPR) yet still achieving minimal performance loss.

7. The method of claim 6, further comprising:
   the system inspecting the data-residuals to determine the presence of any multipath signal reflections and lengthening the symbol processing period in a manner to ensure convergence of an A, B estimation.

8. The method of claim 7, further comprising:
   utilizing only a single sampled signal rather than real and imaginary sampled signals.

9. The method of claim 7, further comprising:
   locating the bandpass filter and modernized Kalman device in a first digital processing module; and
   processing only a single sampled signal rather than real and imaginary sampled signals.

10. The method of claim 7, further comprising:
    configuring a minimal cost receiver design to have only an antenna, BPF, LNA and signal processor; and
    communicating via RF Direct.

11. The method of claim 3, further comprising:
    repurposing an IQMixer to separate a signal into two independent signals;
    processing each of the two signals each independently; thereby
    achieving a 2× improvement in data rate yet remaining within a predetermined bandwidth.

12. The method of claim 11, further comprising:
    the preconfigured bandwidth corresponding with requirements of a satellite vendor.

13. The method of claim 11, further comprising:
    the preconfigured bandwidth corresponding with requirements of an ISP.

14. The method of claim 13, further comprising:
    using a single radio-frequency receiver within an existing communication channel.

15. The method of claim 14, further comprising:
    utilizing a wide-band antenna and LNA in the single RF receiver;
    pre-configured hardware and firmware selecting a specific radio frequency; and
    the modernized Kalman device subsampling a waveform of the RF signal so that the digital sampling can occur at frequencies well below a chosen carrier frequency.

16. The method of claim 15, further comprising:
    uncoupling the digital sampling rate of the antenna signal from the subcarrier frequency spacing.

17. The method of claim 16, further comprising:
    the modernized Kalman device utilizing the multicarrier signal model represented by a sum of multiple subcarriers that are spaced in frequency about that carrier frequency.

18. The method of claim 17, further comprising:
    arranging a model within the modernized Kalman device to accommodate a subcarrier frequency layout where the frequencies need not be equally spaced.

19. The method of claim 11, further comprising:
    utilizing a single radio-frequency system within a satellite system at 10.7 GHZ; and
    attenuating all signals outside 107.7 GHz.

20. The method of claim 11, further comprising:
    utilizing a single radio-frequency system within an Internet router at 2.4 GHz; and
    attenuating all signals outside 2.4 GHz.

\* \* \* \* \*